United States Patent [19]

Satoh et al.

[11] Patent Number: 4,882,634
[45] Date of Patent: Nov. 21, 1989

[54] APPARATUS FOR REPRODUCING INFORMATION SIGNALS BY INTERMITTENTLY FEEDING TAPE-SHAPED RECORD BEARING MEDIUM

[75] Inventors: Keiji Satoh; Susumu Kozuki, both of Tokyo, Japan

[73] Assignee: Canon Kabushiki Kaisha, Tokyo, Japan

[21] Appl. No.: 27,161

[22] Filed: Mar. 17, 1987

[30] Foreign Application Priority Data

Mar. 18, 1986 [JP] Japan ................................ 61-058155
Mar. 18, 1986 [JP] Japan ................................ 61-058156

[51] Int. Cl.⁴ ............................................. G11B 21/10
[52] U.S. Cl. .................................. 360/10.2; 360/77.13
[58] Field of Search .................... 360/10.1, 10.2, 10.3, 360/73, 77, 9.1; 358/312

[56] References Cited

U.S. PATENT DOCUMENTS

| 4,163,993 | 8/1979 | Ravizza ............................... 358/312 |
| 4,581,658 | 4/1986 | Azuma et al. ....................... 360/10.2 |
| 4,682,247 | 7/1987 | Doutsubo ............................ 360/10.2 |

Primary Examiner—Robert L. Richardson
Attorney, Agent, or Firm—Robin, Blecker & Daley

[57] ABSTRACT

A reproducing apparatus for reproducing signals from a number of tracks formed in a direction different from a first direction of feeding a recording medium at a given speed, wherein in driving the recording medium intermittently in a second direction reverse to the first direction such intermittent drive of said recording medium is controlled by the output signals of the reproducing heads given during the periods of stopping the recording medium.

17 Claims, 8 Drawing Sheets

APPARATUS FOR REPRODUCING INFORMATION SIGNALS BY INTERMITTENTLY FEEDING TAPE-SHAPED RECORD BEARING MEDIUM

BACKGROUND OF THE INVENTION

1. Field of the Invention

This invention relates to an apparatus for reproducing signals from a recording medium generally, and more particularly to an apparatus for reproducing signals by feeding the recording medium intermittently.

2. Description of the Related Art

In this specification, a rotary two-head video tape recorder (VTR) will be taken as an example and described below.

Conventionally, this type of VTR has employed a procedure for tracking control to accurately trace the tracks formed in a direction intersecting the forward direction of the tape and at given pitches by using four types of pilot signal of different frequencies from each another which are superimposed and recorded on the adjacent tracks in sequence In this type of VTR with such control of tracking, four types of pilot signal of different frequencies from each other are superimposed and recorded on video signals. The reference signal with a frequency relating to the pilot signal frequency recorded on a track to be controlled which the heads are mostly tracing in reproduction is multiplied with the reproduced signal from the heads, and the cross-talk portions of the pilot signals from both adjacent tracks are obtained to detect the level difference between both cross-talk portions, in order to control the relative position of each head and that of the magnetic tape.

In the VTR with control of tracking using these four types of pilot signal, it has been difficult to detect the relative positions of the magnetic heads and those of the tracks when the tape is fed at a speed which is different from that for recording. When a special reproduction such as still or slow is performed, there has been a problem that the reproduced outputs of the magnetic heads have poor stability.

For instance, in the so-called slow-motion reproduction in the conventional VTR of this type, noise-free slow-motion reproduced pictures have been generally obtained by driving the tape intermittently and repeating the normal reproduction and the still picture reproduction. An example of the technique for slow-motion reproduction using such a procedure has been proposed by the U.S. Pat. application Ser. No. 263,981, which is a continuation of U.S. Pat. application Ser. No. 779,668, now abandoned, (invented by Mabuchi et al) assigned to the assignee of this invention.

SUMMARY OF THE INVENTION

With the reproducing apparatus with intermittent feed of a recording medium in the above-mentioned background, it is a primary object of this invention to provide reproducing apparatus in which the reproducing speed can be set freely Another object of this invention is to provide a reproducing apparatus which can obtain good reproduction particularly by feeding a recording medium intermittently in a direction reverse to that in recording.

Under the foregoing objects, one of the embodiments of this invention is a reproducing apparatus for reproducing signals from a number of tracks formed in a direction different from a first direction of feeding a recording medium at given speed, comprising a reproducing head to trace the recording medium periodically, driving means for driving the recording medium intermittently in a second direction different from the first direction, and controlling means for controlling the driving means by the output signals from the reproducing heads during the stop of the recording medium.

A further object of this invention is to provide a reproducing apparatus for reproducing signals by driving a recording medium intermittently, wherein a number of reproducing speeds can be set by a simple circuit configuration.

Under this object, another embodiment of this invention is a reproducing apparatus for reproducing signals from a number of tracks formed by feeding a recording medium at a given speed, comprising a reproducing head to trace the recording medium periodically, feeding means for feeding the recording medium intermittently, signal generating means for generating periodic signals for the tracing periods of the reproducing heads, frequency dividing means for dividing the frequencies of the periodic signals, setting means for setting a frequency dividing rate selectively from a plurality of frequency dividing ratio for the frequency dividing means, and means of determining the start timing of the recording medium for the feeding means in accordance with a signal of the frequency divided by the frequency dividing means.

Further objects other than the foregoing ones and their features of this invention will become apparent from the following detailed description of preferred embodiments thereof taken in conjunction with the accompanying drawings.

DETAILED DESCRIPTION OF THE PREFERRED EMBODIMENTS

This invention will be described taking a two-head helical scan VTR as an example of the preferred embodiments thereof.

First, the relation of the head traces with the tracks in still reproduction of the VTR and a tracking error signal (ATF signal) showing a deviation between the heads and the tracks will be described.

In the VTR in which recording is performed with its two-rotary heads of different azimuth angles from each other, there are two types of still reproduction; one is a so called frame still mode in which the video signals of two fields are reproduced by the rotary heads with different azimuth angles in sequence, and the other is a so-called field still mode in which the video signals of one field are repeatedly reproduced by the two rotary heads with the same azimuth angle, provided separately from the head for normal reproduction.

Figure 1A:
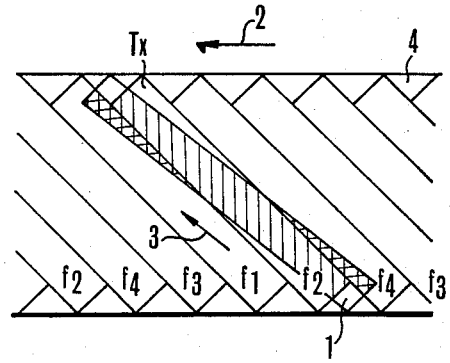
FIG. 1 (A) and FIG. 1 (B) are diagrams showing the state and each signal's timing on a magnetic tape which is stopped at its ideal stop position in field still.
Figure 1B:
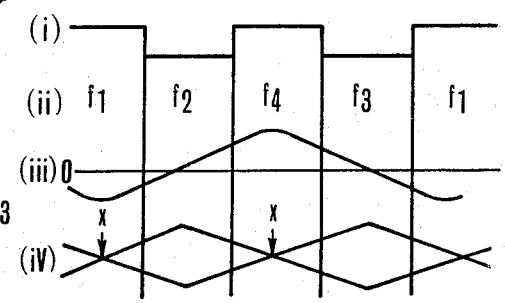
Figure 2A:
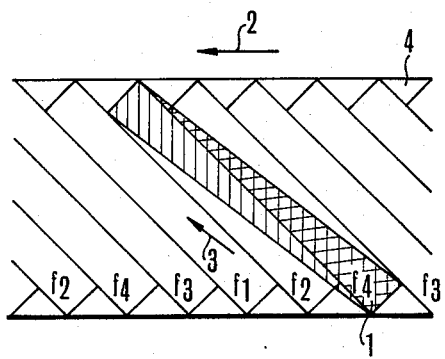
FIG. 2 (A) and FIG. 2 (B) are diagrams showing the state and each signal's timing on a magnetic tape which is stopped in its ideal stop position in frame still.
Figure 2B:
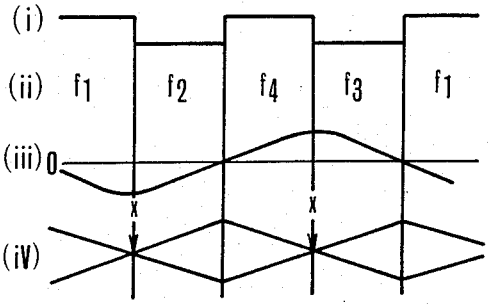

Fig. 1 (A) and Fig. 1 (B) are diagrams illustrating the state and each signal's timing on a magnetic tape which is stopped in an ideal stop position in the field still. FIG. 2 (A) and FIG. 2 (B) are diagrams illustrating the state and each signal's timing on a magnetic tape which is stopped in an ideal position in the frame still.

In FIG. 1 (A) and FIG. 2 (A), the illustration includes a trace 1 of the head, the feeding direction 2 of the tape, the tracing direction 3 of the head, the tape 4, the tracks on which the pilot signals of frequencies $f_1$ through $f_4$ are recorded respectively. In FIG. 1 (B) and FIG. 2 (B), (i) illustrates a head switching signal (30PG) of 30Hz which is synchronized with the rotations of the rotary heads, (ii) the frequencies of the pilot signals recorded on the tracks reproducing the video signals, and (iii) the ATF signal and (iv) the envelope waveforms of the reproduced signals.

In still reproduction, a video track deviates from the head trace by one track pitch in one field, so that the ATF signal (iii) produces a swell of one period per four fields, as shown in FIGS. 1 (B) and 2 (B). Now, if the tape is stopped in the state as shown in FIG. 1 (A), the maximum output point of one head with the same azimuth angle as that of the other head that has recorded the track $T_x$ is the video signal at the middle of the picture, which is the ideal stop position of the tape in the field still.

In the frame still, on the other hand, the maximum output point and the minimum output point of the head should be coincident with the head switching point in order that no noise bar can appear on the picture screen, as shown in FIG. 2 (A). In other words, the tape should be stopped so that the head's intruding position is coincident with the position of a track to be reproduced or its adjacent track.

The ATF signal for this case will be observed; the ATF signal at level 0 (more accurately, at the level $V_j$ that is determined by the difference in the frequency characteristic) means the condition that the head is tracing accurately on a recorded track.

Therefore, good still reproduction can be realized when the ATF signal is at level 0 at the middle timing during the trace period of the head used for both the normal reproduction and the still reproduction in the field still, and at the time of head switching in the frame still.

Figure 3:
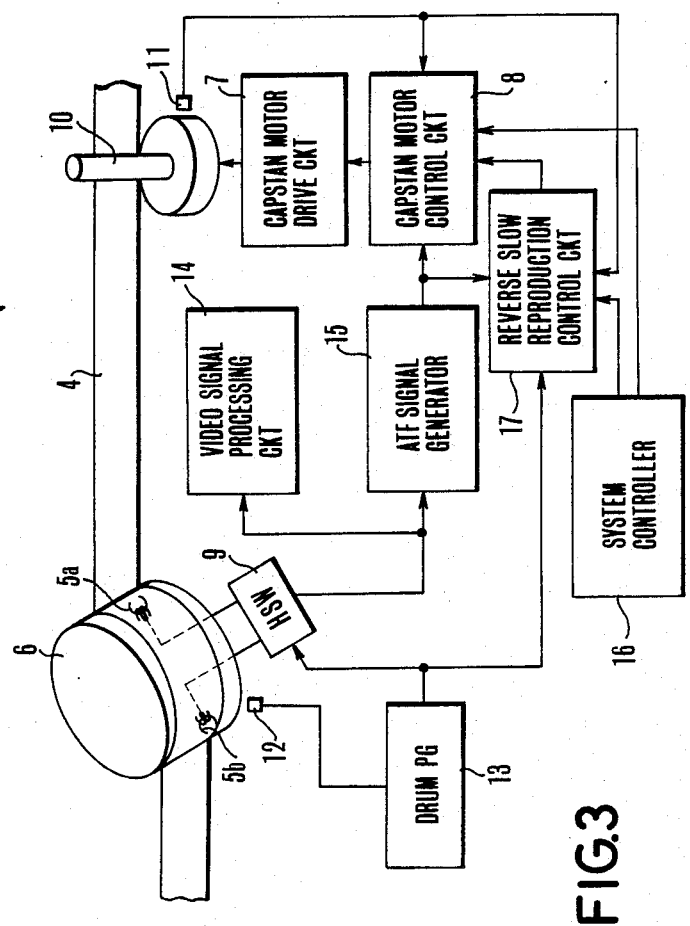
FIG. 3 is a block diagram showing a VTR arranged as an embodiment of this invention

FIG. 3 is a block diagram of a VTR arranged as an embodiment of this invention. In FIG. 3, the illustration includes a magnetic tape 4, and two rotary reproducing heads 5a and 5b, which have different magnetizing directions from each other, and a cylinder 6 provided with the rotary heads 5a and 5b, which guides the magnetic tape 4 on its circumferential surface. The reproduced signals reproduced by the heads 5a and 5b are arranged through a head switching circuit (HSW) 9 to be a continuous signal, which is fed into a video signal processing circuit 14 and an ATF signal generating circuit 15. The HSW 9 is controlled by 30PG which is produced by a detector 12 and a generator 13.

The continuous signal obtained from the HSW 9 is processed at the video signal processing circuit 14 to separate the video signal components, which are then reformed to the original signal form (for instance, to the video signals conforming to the NTSC signal) and outputted. Meanwhile, the pilot signal components of four frequencies are separated from that continuous signal at the ATF signal generating circuit 15, at which the ATF signal is obtained by a generally known signal processing procedure.

Now, this signal processing procedure will be explained briefly. The reproduced pilot signal included in the reproduced signal from the heads is multiplied with the signal (reference pilot signal) of the same frequency as that of the pilot signal superimposed on the track (master track) to be reproduced and the differential frequency signals that are the differences of the resulting signal with the pilot signals reproduced from both tracks adjacent to the master track are compared in their levels in order to detect a tracking error and to obtain the ATF signal.

The ATF signal so obtained is fed into a capstan motor control circuit 8, which controls the capstan 10 through a capstan motor drive circuit 7 in normal reproduction. The capstan 10 makes the tape 4 to run in conjunction with a pinch roller not shown in FIG. 3. Its rotations are detected by the detector 11, from which X pulses for instance are generated per rotation of the capstan 10. These pulses are fed as so-called capstan FG to the capstan motor control circuit 8 and the reverse slow reproduction control circuit 17 that will be described in detail later. The capstan FG is fed into the capstan motor control circuit 8 to form a speed control loop.

The reverse slow reproduction control circuit 17 is used for controlling the rotations of the capstan 10 during reproduction. The reverse slow reproduction control circuit 17 will be described taking an example below.

Figure 4:
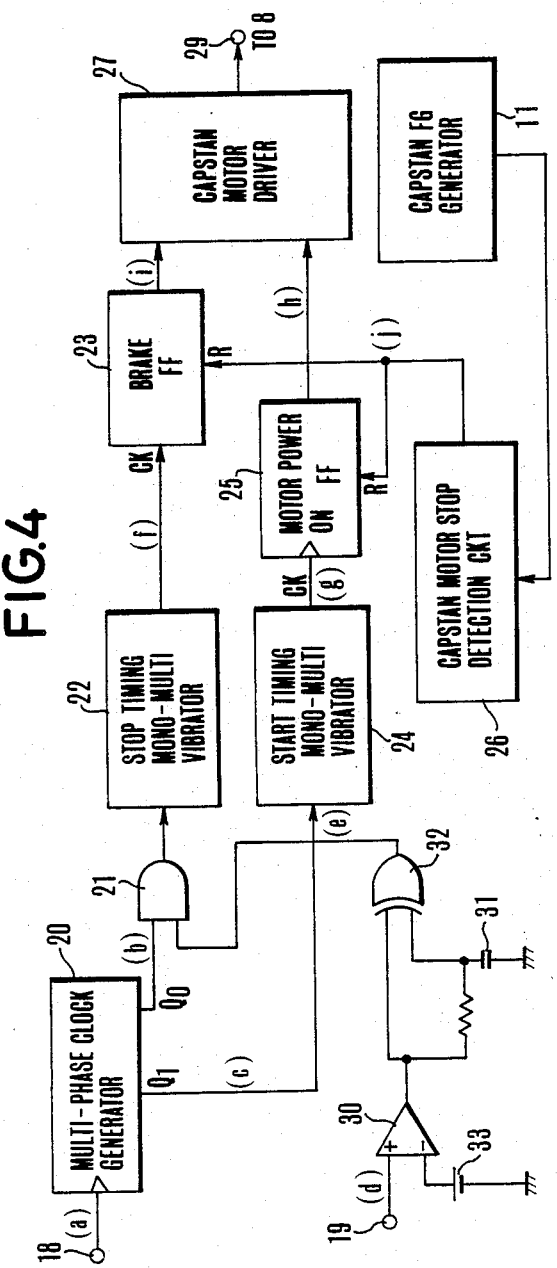
FIG. 4 is a diagram illustrating a circuit configuration of the reverse slow reproduction control circuit shown in FIG. 3.

FIG. 4 is a block diagram of the reverse slow reproduction control circuit 17. In this figure, the illustration includes an input terminal 18 for 30PG obtained from the detector 12 and the generator 13 in FIG. 3, an input terminal 19 for the ATF signal, a multi-phase clock generator 20 to generate a multi-phase clock from the input signal to the terminal 18, and a comparator 30 to compare the ATF signal entered from the terminal 19 and the level $V_j$ set by a reference power source 33. A capacitor 31 and an exclusive OR (EX-OR) circuit 32 constitute a time constant circuit to detect the rise and fall edges of the output pulses from the comparator 30. An AND circuit 21 makes a logical AND of the output signal of the EX-OR circuit 32 and the signal $Q_o$ generated at the multi-phase clock generator 20. The signal from the AND circuit 21 sets a mono-multi-vibrator 22, and the signal $Q_1$ generated at the multi-phase clock generator 20 sets a mono-multi-vibrator 24. A flip-flop (FF) 25 is set at the timing to reset the mono-multi-vibrator 24 and reset by the signal generated by the capstan motor stop detection circuit 26 to detect the stop of the capstan motor. A flip-flop 23 is set at the timing to reset the mono-multi-vibrator 22 and reset by the signal generated at the capstan motor stop detection circuit 26. A capstan motor driver 27 drives the capstan motor 29 during the reverse slow reproduction. The frequency signal (capstan FG) to detect the rotation speed of the capstan motor is generated by a detector 11 shown in FIG. 3.

Figure 5:
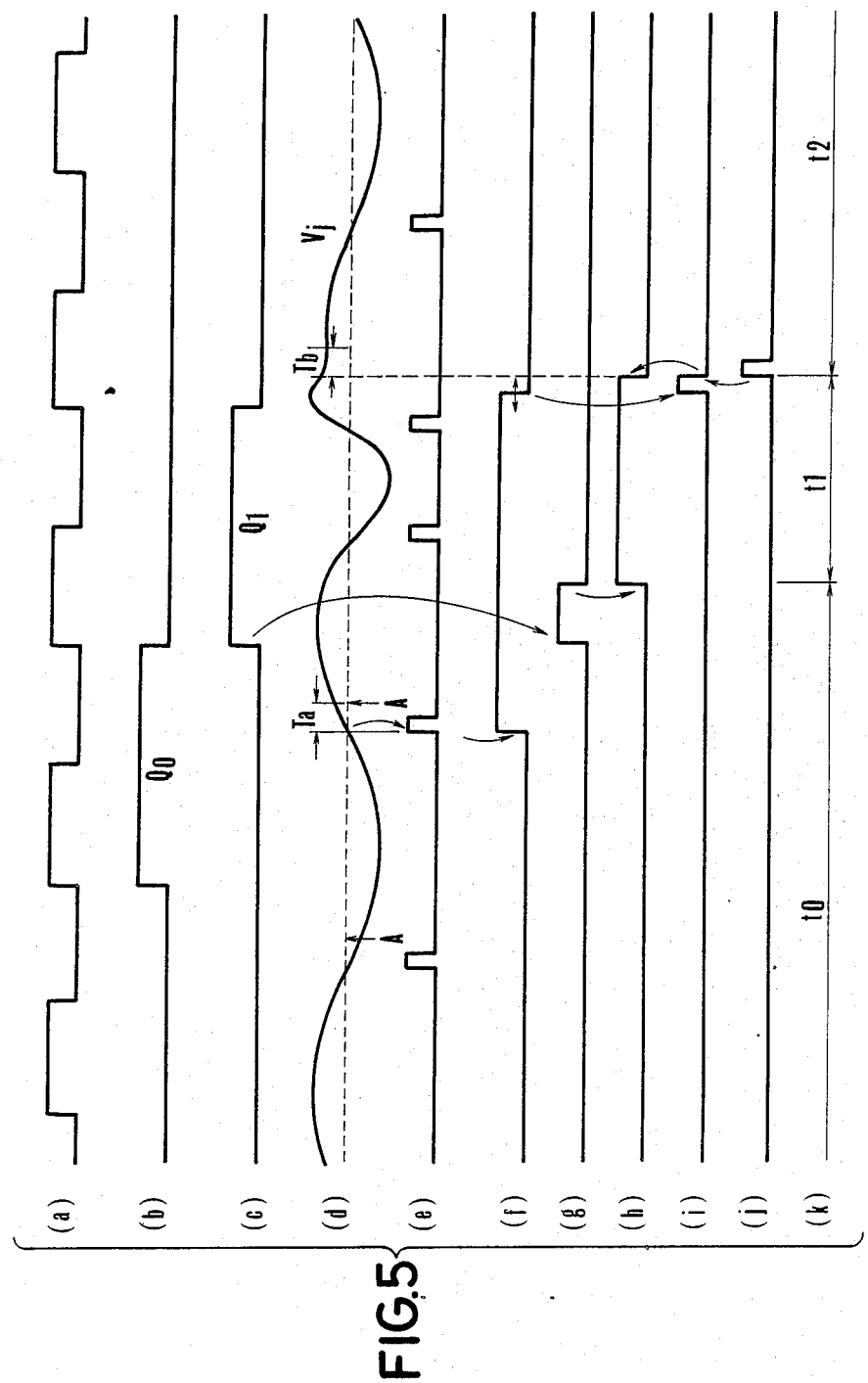
FIG. 5 is a timing chart showing the waveforms at several parts the circuit shown in FIG. 4.

FIG. 5 is a timing chart illustrating the signal states at the important blocks shown in FIG. 4. In FIG. 5, (a) is 30PG, and (b) and (c) are the clock signals $Q_0$ and $Q_1$ and generated at the multi-phase clock generator 20 respectively. (d) is the ATF signal, the level $V_j$ of which is determined by the reference power source 33. (e) is the output pulses from the EX-OR circuit 32 which show that the ATF signal is at the level $V_j$ (f) is the output signal of the mono-multi-vibrator 22 for stop timing generation. (g) is the output signal of the mono-multi-vibrator 24 for start timing generation. (h) is the signal to show the set and reset status of the FF 25. (i) is the output signal from the FF 23 to control the direction to feed the rotating torque to the capstan motor. (j) is the output signal from the capstan motor stop detection circuit 26 when detecting that the capstan motor has stopped. $t_0$ and $t_2$ shown in (k) are the periods during which the still condition is kept, and $t_1$ is a time interval in which the tape is fed in the reverse direction to that for recording but at the same speed.

The operation of the circuits, in FIG. 4 will be described below.

As described previously, now if the head is tracing accurately on the track at the timing A shown in FIG. 5 (d) relative to the phase of the 30PG in the field still, the tape is in its ideal stop position. In the condition as shown in this figure, the tape is stopped at a distance corresponding to the time Ta in the reverse feeding direction from the timing A in a period $t_0$. When the signal $Q_0$ in (b) is given from the multi-phase clock generator 20 to control the motor start timing, the AND circuit 21 gates one pulse signal from the EX-OR circuit 32 and sets the mono-multi-vibrator 22 for generating the stop timing pulse shown by the signal (f). The output signal of the mono-multi-vibrator 24 for generating the start timing pulse shown by the signal (g) is set by the rising edge of the signal $Q_1$ in (c) from the multi-phase clock generator 20. The mono-multi-vibrator 24 is reset after it is set for a preset time interval, and it sets the FF 25 for setting the motor on. The capstan motor driver 27 drives the capstan motor 29 while the FF 25 is set, so that it is controlled to feed the tape. When the capstan motor 29 continues to drive the feed of the tape, the mono-multi-vibrator 22 for generating the stop timing pulse, which has been set, is reset. Then, the FF 23 for brake is set and the signal (i) shown in FIG. 5 is fed into the capstan motor driver 27. This signal controls the capstan motor driver 27 so that a torque is applied to the capstan motor 29 in such a direction as to brake the motor that is being driven while the FF 23 for brake is set. The moment that the tape is stopped after the capstan motor 29 is fed with a brake torque to reduce the tape feeding speed, the pulse (j) in FIG. 5 is given from the capstan motor stop detection circuit 26 and it resets the FF 24 for brake and the FF 25 for powering the motor in order to stop the capstan motor 29 and to bring the tape into the still state.

In said operation, if the tape stop position in still reproduction for the period $t_0$ is at a distance corresponding to the time interval Ta in the reverse feeding direction from the ideal tape stop position, the feeding period $t_1$ is shortened by $T_b$ (=Ta). As a result, the feeding time interval Ta for $t_0$ is null for the period $t_2$ and the just track timing is at the middle of the reproducing period for one field, so that the tape can be stopped at the ideal stop position for field still reproduction. Further, if $t_0-t_1$ is repeated, the intermittent reverse slow reproduction can be realized.

The set time for the mono-multi-vibrator 24 for generating the start timing pulse is adjusted so that the capstan motor 29 is started in its ideal phase to the head switching signal (a) when Ta=0, and the set time for the mono-multi-vibrator 22 for generating the stop timing pulse is also adjusted so that the tape is stopped at its ideal stop position for still reproduction when Ta=0.

In the case that the above embodiment is applied to a VTR for frame still, the tape can also be stopped at the ideal stop position by varying the set time intervals for the mono-multi-vibrators 22 and 24.

In the VTR arranged as the embodiment described above, the feed amount of the recording medium can be controlled to obtain good reproduced signals in the case that the recording medium is driven intermittently in the reverse direction to that in recording.

Figure 6:
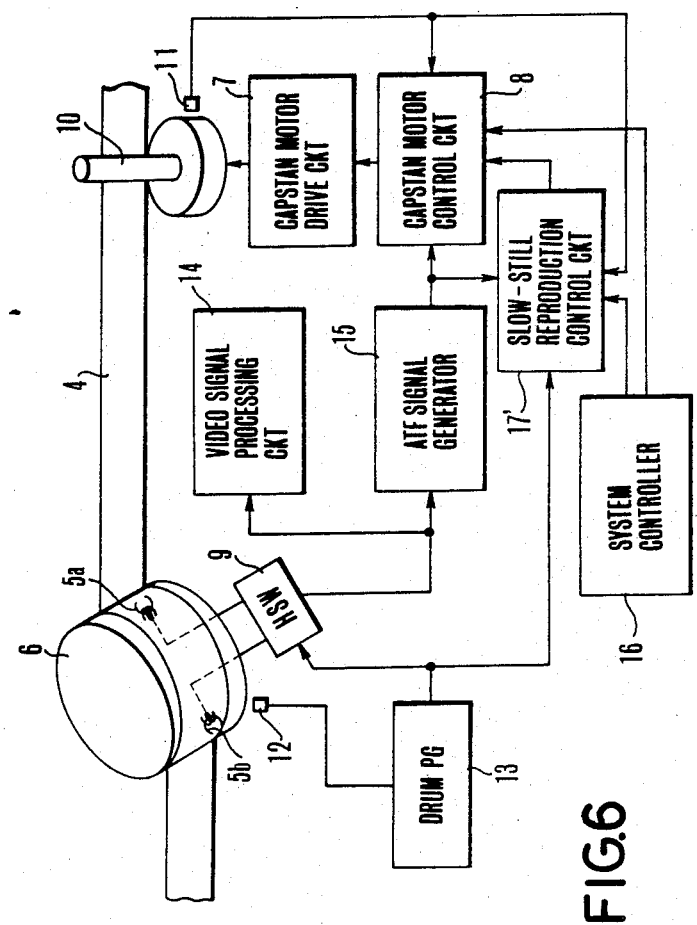
FIG. 6 is a block diagram of a VTR according to another embodiment of this invention.

FIG. 6 is a block diagram illustrating the main circuits of the VTR arranged as another embodiment of this invention, in which the reverse slow reproduction control circuit 17 in FIG. 3 is only changed into a slow-still reproduction control circuit 17'.

Figure 7:
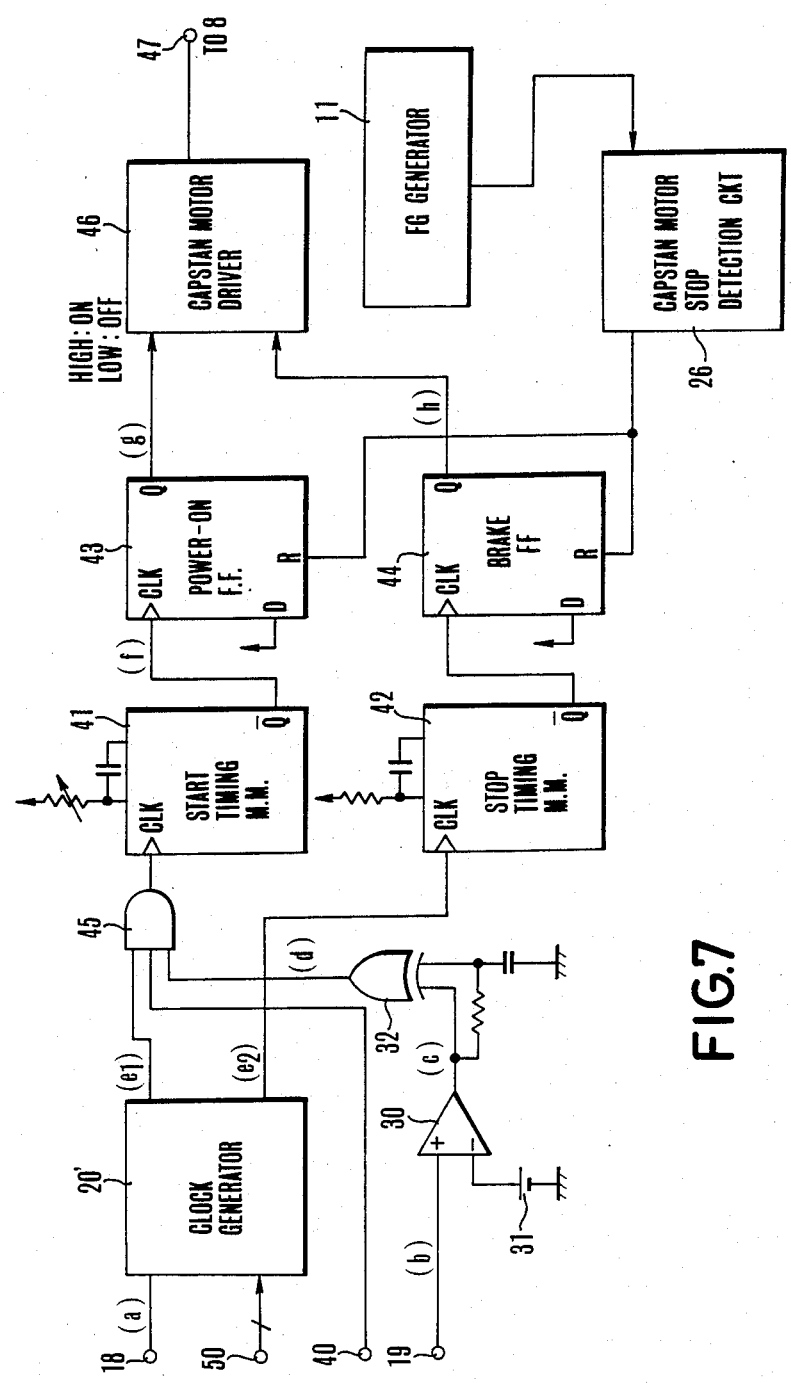
FIG. 7 is a diagram illustrating a circuit configuration of the slow-still reproduction control circuit shown in FIG. 6.

The slow-still reproduction control circuit 17' will be described below. FIG. 7 illustrates the circuit configuration of the slow-still reproduction control circuit 17'. In FIG. 7, the 30PG as described previously is fed to a terminal 18. The clock generation circuit 20' generates a clock signal in accordance with the input signal from the terminal 18, as described later. When the apparatus is set to still reproduction (still picture reproduction) mode by the system controller 16, a low-level (L) signal is fed to the terminal 40, while a high-level (H) signal is fed to the terminal 40 when the apparatus is set to slow motion reproduction mode by the system controller 16. The tracking error (ATF) signal indicating a deviation between the track's and the head's positions to be controlled by the above-mentioned procedure is fed to a terminal 19. 31 is a power source for reference voltage, and 30 is a comparator as shown in FIG. 4, which compares the level of the ATF signal fed from the terminal 19 with the level to be determined by the power source 31 having constant voltage. The exclusive OR (EX-OR) circuit 32 detects the edges of the output signal from the comparator 30. The signals from the clock generator 20', the terminal 40 and the EX-OR circuit 32 are fed to the AND circuit 45 to make a logical AND. The monostable multivibrator 41 for start timing determination is triggered by the output signal of the AND circuit 45. The flip-flop (FF) 43 is set by the Q output of the multivibrator 41 and reset by the capstan motor stop detection circuit 26 to detect the reduced speed of the capstan motor as shown in FIG. 4, in order to generate the control signal for setting the capstan motor driver 46 to on or off. The monostable multivibrator 42 for stop timing determination is triggered by the signal $e_2$ generated by the clock generator 20'. The flip-flop 44 is set by $\overline{Q}$ output of the multivibrator 42 and reset by the signal generated by the capstan motor stop detection circuit 26, in order to control the direction of the rotating torque applied to the motor.

As the capstan motor is rotated, the frequency generator (FG) 11 generates the pulse signal which is transmitted to the capstan motor stop detection circuit 26. The capstan motor stop detection circuit 26 detects in accordance with the FG pulses that the rotating speed of the capstan motor is enough slow to transmit the reset signal to the FF 43 for power-on and the FF 44 for brake.

Figure 8:
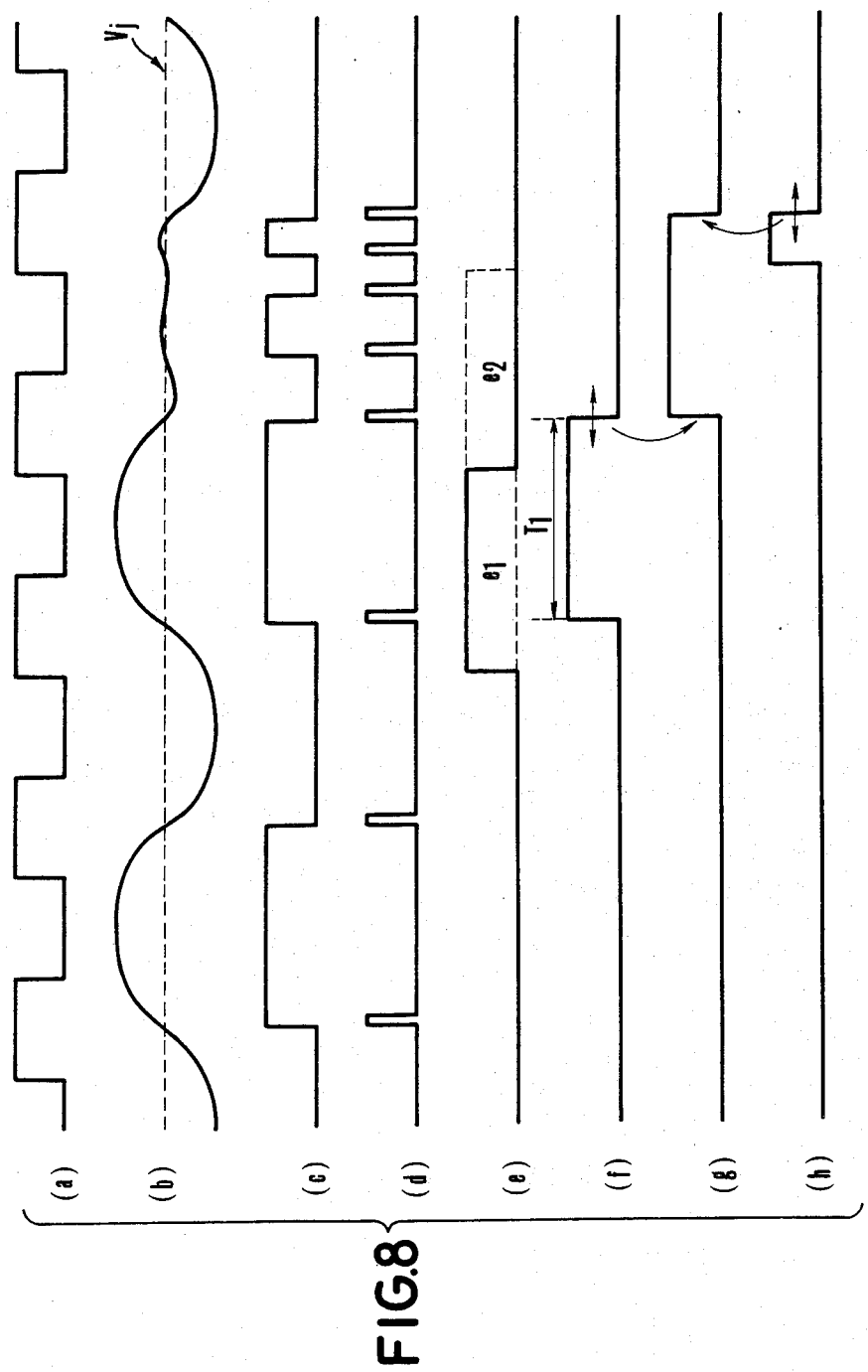
FIG. 8 is a timing chart illustrating the waveforms at several parts in circuits shown in FIG. 7.

FIG. 8 is a timing chart illustrating the waveforms of the signals given at the points (a) through (h) in FIG. 7.

The operation of this embodiment will be described in connection with FIG. 7 and FIG. 8.

In the still reproduction mode, the ATF signal fed into the terminal 19 is a sine wave having a specific period as shown in FIG. 8 (b). This sine wave is fed into the comparator 30, at which the waveform as shown in FIG. 8 (c) is given. The edges of this waveform is detected by the edge detecting circuit including the EX-OR circuit 32 in order to obtain the signal as shown in FIG. 8 (d).

The clock generator 20′ shown in FIG. 7 generates the output signals $e_1$ and 2 as shown in FIG. 8 (e). These signals are synchronized with the head switching signal fed into the clock generator 20′ as shown in FIG. 8 (a). The periods of the signals el and $e_2$ are determined by the frequency dividing ratio of the clock generator 20′.

The multivibrators 41 and 42, the FFs 43 and 44, the capstan motor driver 46, the capstan, the FG pulse generator 11 and the capstan motor stop detector 26 shown in FIG. 7 are so connected as to make a series of operations for feeding the tape by an amount in which one frame of video signals, is recorded. More precisely, when the ATF signal becomes $V_j$, a trigger is fed into the multivibrator 41, and after a given time T1 which is determined by the time constant of this multivibrator, the FF 43 is set to ON to actuate the capstan motor driver 46 that drives the capstan to start feeding the tape for normal reproduction. When a necessary time to feed the tape by frame has passed, the capstan motor is braked by the signal $e_2$, the MM 42 and the FF 44 to stop and the still reproduction is continued until another trigger is fed into the multivibrator 41.

In the slow-motion reproduction by intermittent tape feed as described above, the slow speed is varied according to a rate of the normal reproduction to the still reproduction. Therefore, one signal given per frame from the edge detecting circuit for the ATF signal (b) is limited at the AND circuit 45 in order to vary the slow speed.

When the still reproduction mode is selected, an L-level signal is fed to the terminal 40, so that no trigger is given from the AND circuit 45. Therefore, the still reproduction mode is kept until an H-level signal is fed to the terminal 40.

Then, when the slow-motion reproduction mode is selected, an H-level signal is fed to the terminal 40. To vary the slow speed freely, the frequency dividing ratio of the clock generator 20° is changed. In this embodiment, any reproducing speed which is less than ⅛ of the normal reproducing speed can be set freely.

Figure 9:
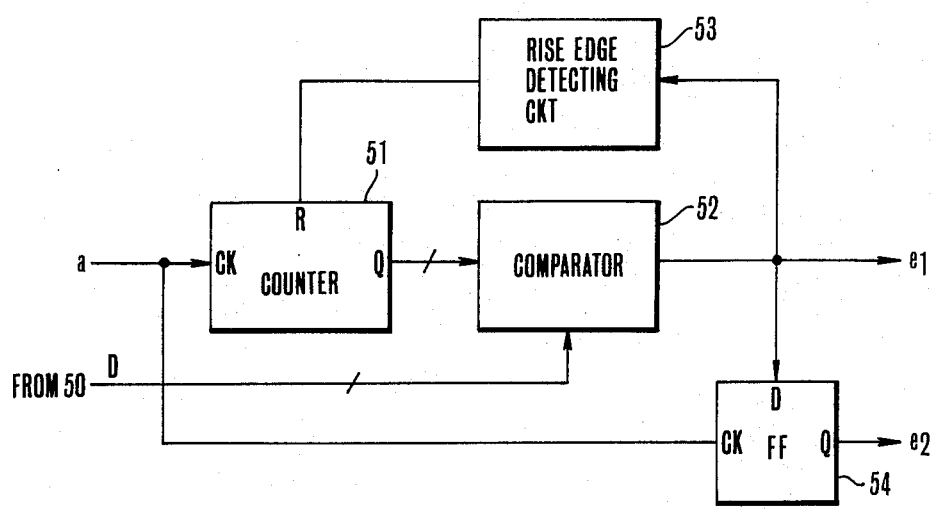
FIG. 9 is a diagram illustrating an embodiment of the clock generating circuit shown in FIG. 7.

A circuit configuration of the clock generator 20′ to determine the slow speed freely as described above will be explained in connection with FIG. 9. In FIG. 9 "a" is a 30PG fed to the clock terminal of the counter 51. Meanwhile, several bits of digital data D are given from the system controller 16 as the slow speed setting data and fed into the comparator 52 through the terminal 50 in FIG. 7. The comparator 52 is fed with the data that is at a high level when the output data of the counter 51 is coincident with the data D and when the value of the data D is an integer n ($\geq 2$), the output of the comparator 52 becomes a high-level data for one frame of (n+1) frames. This output $e_1$ is fed into the AND circuit 45 and into the edge detecting circuit 53 in order to reset the counter 51.

In a frame following the frame in which the output $e_1$ of the comparator 52 is at a high level, the Q output $e_2$ of the FF 54 becomes high-level and it is fed into the MM 42 in FIG. 7.

In the circuit configuration as described above, it is realized that when the value of data D is n, the speed of slow reproduction can be reduced to 1/(n+1). If the circuit shown in FIG. 9 is used in the multi-phase clock generator 20 in FIG. 4, the reverse slow reproduction at the -1/(n+1) speed can be realized. In the embodiment described above, any speed can be selected freely to perform noiseless slow motion reproduction.

What is claimed is:

1. An information signal reproducing apparatus for reproducing information signals from a tape-shaped record bearing medium on which many tracks are formed, comprising:
   (a) a rotary head arranged to trace said tape-shaped record bearing medium;
   (b) moving means for moving said tape-shaped record bearing medium in longitudinal direction;
   (c) control means for controlling said moving means, in such a manner that said moving means is alternately in a first state and a second state, said moving means moving said tape-shaped record bearing medium at a predetermined speed in said first state, and said moving means not moving said medium in said second state;
   (d) means for generating a tracking error signal which indicates the tracking error of said rotary head relative to one of said many tracks, by using a signal reproduced by said rotary head; and
   (e) means for generating a first signal for indicating a first timing at which a level of said tracking error signal is a predetermined level while said moving means is in said second state;
   said control means changing a state of said moving means between said first state and said second state at a timing as a predetermined period after said first timing.

2. An apparatus according to claim 1, further comprising means for generating a second signal for indicating a second timing at which a rotating phase of said rotary head is a predetermined phase;
   wherein said control means changes the state of said moving means from the second state to the first state at a timing as a predetermined period after said second timing.

3. An apparatus according to claim 1, wherein said first signal generating means includes a comparison circuit for comparing the level of said tracking error signal with the predetermined level to produce a rectangular signal, and an edge detection circuit for detecting an edge of said rectangular signal to produce a pulse signal.

4. An apparatus according to claim 3, wherein said first signal generating means further includes a gate circuit for gating said pulse signal produced by the edge detection circuit in response to a rotation of said rotary head.

5. An apparatus according to claim 1, further comprising mode setting means for setting a mode of the apparatus among a plurality of modes, said plurality of modes including a first mode in which said moving means is controlled by said control means and a second mode in which said moving means moves said tape-shaped record bearing medium constantly.

6. An apparatus according to claim 5, further comprising tracking means for controlling said moving means to decrease the tracking error by using said tracking error signal while the apparatus is in said second mode.

7. An apparatus according to claim 5, wherein said moving means moves said tape-shaped recording bearing medium in a first direction in said first state when the apparatus is in said first mode, said moving means moves said tape-shaped record bearing medium in a second direction which is reverse to the first direction.

8. An apparatus according to claim 1, wherein said control means changes the state of said moving means from said first state to said second state at the timing determined by the timing signal.

9. An apparatus according to claim 1, wherein said control means changes the state of said moving means from said second state to said first state at the timing determined by the timing signal.

10. An information signal reproducing apparatus for reproducing information signals from a tape-shaped record bearing medium on which many tracks are formed, comprising:
(a) a rotary head arranged to trace said tape-shaped record bearing medium;
(b) moving means for moving said tape-shaped record bearing medium in longitudinal direction;
(c) control means for controlling said moving means in such a manner that said moving means is alternately in a first state and a second state, said moving means moving said tape-shaped record bearing medium at a predetermined speed in said first state, and said moving means not moving said medium in said second state;
(d) means for generating a tracking error signal which indicates the tracking error of said rotary head relative to one of said many tracks, by using a signal reproduced by said rotary head;
(e) means for generating a pulse signal in response to the tracking error signal;
(f) means for generating a cyclic rectangular signal which relates to a rotating cycle of said rotary head; and
(g) gate means for gating said pulse signal in response to said cyclic rectangular signal to produce a timing signal, said control means changing a state of said moving means between said first and second state at a timing determined by the timing signal.

11. An apparatus according to claim 10, wherein said cyclic rectangular signal generating means includes a detection circuit for detecting a rotating phase of said rotary head to produce a signal which has a cycle relating to a rotating cycle of said rotary head, and a frequency dividing circuit for frequency dividing the signal produced by said detection circuit to produce said cyclic rectangular signal.

12. An apparatus according to claim 11, wherein said dividing circuit is arrange to be able to change a dividing ratio.

13. An apparatus according to claim 12, wherein said dividing circuit includes a counter element which counts a clock pulse signal of a predetermined frequency, a data generator which generates a reference data, and a comparator which compares the reference data with the counted value of the counter element.

14. An apparatus according to claim 10, wherein said control means changes the state of said moving means from said second state to said first state at the timing determined by the timing signal.

15. An apparatus according to claim 10, further comprising mode setting means for setting a mode of the apparatus among a plurality of modes, said plurality of modes includes a first mode in which said moving means is controlled by said control means and a second mode in which said moving means moves said tape-shaped record bearing medium constantly.

16. An apparatus according to claim 15, further comprising tracking means for controlling said moving means to decrease the tracking error by using said tracking error signal while the apparatus is in said second mode.

17. An apparatus according to claim 15, wherein said moving means moves said tape-shaped record bearing medium in a first direction in said first state when the apparatus is in said first mode and said moving means moves said tape-shaped record bearing medium in a second direction which is reverse to the first direction.

* * * * *